(12) United States Patent
Wang

(10) Patent No.: US 9,930,266 B2
(45) Date of Patent: Mar. 27, 2018

(54) METHODS FOR GENERATING HDR (HIGH DYNAMIC RANGE) IMAGES AND APPARATUSES USING THE SAME

(71) Applicant: VIA Alliance Semiconductor Co., Ltd., Shanghai (CN)

(72) Inventor: Xu Wang, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 131 days.

(21) Appl. No.: 14/972,512

(22) Filed: Dec. 17, 2015

(65) Prior Publication Data

US 2017/0034414 A1 Feb. 2, 2017

(30) Foreign Application Priority Data

Jul. 31, 2015 (CN) .......................... 2015 1 0464824

(51) Int. Cl.
*H04N 5/235* (2006.01)
*H04N 5/14* (2006.01)
*H04N 5/232* (2006.01)

(52) U.S. Cl.
CPC ........... *H04N 5/2355* (2013.01); *H04N 5/145* (2013.01); *H04N 5/23254* (2013.01)

(58) Field of Classification Search
CPC ............................ H04N 5/2355; H04N 5/145
See application file for complete search history.

(56) References Cited

U.S. PATENT DOCUMENTS

2014/0079333 A1* 3/2014 Hirai .................. H04N 5/23235
382/255

* cited by examiner

*Primary Examiner* — Twyler Haskins
*Assistant Examiner* — Fayez Bhuiyan
(74) *Attorney, Agent, or Firm* — McClure, Qualey & Rodack, LLP

(57) ABSTRACT

A method for generating HDR (High Dynamic Range) images, performed by a processing unit, is introduced to at least contain: acquiring a frame 0 and a frame 1; calculating a first MV (Motion Vector) between the frame 0 and the frame 1; acquiring a frame 2; predicting a second MV between the frame 0 and the frame 2 according to the first MV, a time interval between shooting moments for the frames 0 and 1 and a time interval between shooting moments for the frames 0 and 2; generating a first MD (Motion Detection) matrix comprising a plurality of first MD flags according to the second MV; and fusing the frame 0 with the frame 2 according to the first MD flags.

20 Claims, 10 Drawing Sheets

METHODS FOR GENERATING HDR (HIGH DYNAMIC RANGE) IMAGES AND APPARATUSES USING THE SAME

CROSS REFERENCE TO RELATED APPLICATIONS

This application claims the benefit of China Patent Application No. 201510464824.9, filed on Jul. 31, 2015, the entirety of which is incorporated by reference herein.

BACKGROUND

Technical Field

The present invention relates to image processing, and in particular, it relates to methods for generating HDR (High Dynamic Range) images and apparatuses using the same.

Description of the Related Art

HDR (High Dynamic Range) images can show a greater range of luminance levels captured in real-world scenes, from direct sunlight to a faint nebula. It is often achieved by capturing and then combining different exposures of the same subject matter. Non-HDR cameras take photographs with a limited exposure range, resulting in loss of detail in saturated or dark areas. HDRM (High Dynamic Range Merging) compensates for this loss of detail by capturing multiple photographs at different exposure levels and combining them to produce a photograph representative of a broader tonal range. However, when subjects moving between images are captured at different exposure levels, a ghost effect is produced around the moving subjects. In addition, if the in-motion subjects present in the over-exposure area or the under-exposure area, which have no information, for example, all pixel values are ones or zeros, this ghost effect cannot be eliminated according to the corresponding information about the motion. Thus, methods for generating HDR images and apparatuses using the same are introduced to reduce the aforementioned drawbacks.

BRIEF SUMMARY

A method for generating HDR (High Dynamic Range) images, performed by a processing unit, is introduced to at least contain: acquiring a frame 0 and a frame 1; calculating a first MV (Motion Vector) between the frame 0 and the frame 1; acquiring a frame 2; predicting a second MV between the frame 0 and the frame 2 according to the first MV, a time interval between shooting moments for the frames 0 and 1 and a time interval between shooting moments for the frames 0 and 2; generating a first MD (Motion Detection) matrix comprising a plurality of first MD flags according to the second MV; and fusing the frame 0 with the frame 2 according to the first MD flags.

An embodiment of an apparatus for generating HDR images is introduced. The apparatus at least contains: a camera module controller coupled to a camera module; and a processing unit. The processing unit acquires a frame 0 and a frame 1 via the camera module controller; calculates a first MV (Motion Vector) between the frame 0 and the frame 1; acquires a frame 2; predicts a second MV between the frame 0 and the frame 2 according to the first MV, a time interval between shooting moments for the frames 0 and 1 and a time interval between shooting moments for the frames 0 and 2; generates a first MD (Motion Detection) matrix comprising a plurality of first MD flags according to the second MV; and fuses the frame 0 with the frame 2 according to the first MD flags.

The method for generating HDR images and the apparatus using the same predict the positions of the in-motion subjects on the frames under abnormal exposure conditions (like the frame 2 under the low-exposure condition and the frame 3 under the high-exposure condition) by employing the information of multiple frames having the in-motion subjects under normal exposure conditions (like the frames 0 and 1) to solve the problems wherein the MV cannot be calculated when the in-motion subjects are moved into the low-/high-exposure area with no information. In addition, the invention further employs the MD flags of the motion blocks calculated by using the predicted MVs to participate in the frame fusion of the HDRM process. The pixel value of the normal-exposure frame is preferably taken into consideration if the pixel is predicted to tend to have a motion and the pixel values of the low-/high-exposure frame is preferably taken into consideration if the pixel is predicted to tend to have no motion, so as to eliminate the ghost effect and avoid the split of the in-motion subject positioned at the border of the low-/high-exposure area.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
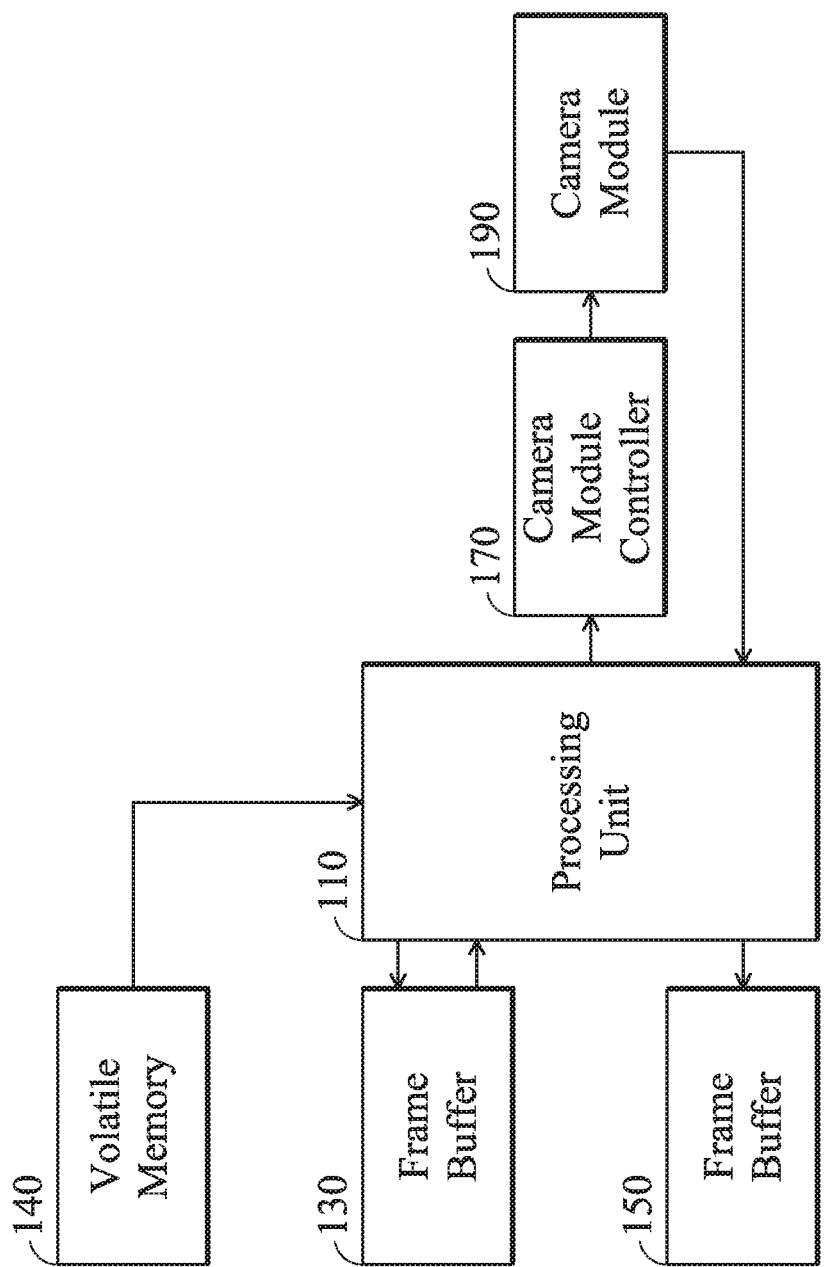
FIG. 1 is a schematic diagram illustrating the system architecture of a computer apparatus according to an embodiment of the invention.

FIG. 1 is a schematic diagram illustrating the system architecture of a computer apparatus according to an embodiment of the invention. The system architecture may be implemented in a desktop computer, a notebook computer, a tablet PC (personal computer), a mobile phone, a digital camera, a digital recorder, or another device which contains at least a processing unit 110. The processing unit 110 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The processing unit 110 may, via a camera module controller 170, control the camera module 190 to capture multiple LDR (Low Dynamic Range) frames and store the LDR frames in the frame buffer 130. The camera module 190 may comprise an image sensor, such as the CMOS (complementary metal-oxide-semiconductor) or CCD (charge-coupled device) sensor, to detect an image in the form of a red, green and blue color, and readout electronic circuits for collecting the sensed data from the image sensor. The processing unit 110 may obtain at least four LDR frames from the frame buffer 130. In an embodiment, the four LDR frames are 12-bit frames. Two LDR frames are captured by the AE (Automatic Exposure) algorithm under the optimized exposure settings, referred to as the frames 0 and 1 hereinafter. It should be noted that the exposure settings for capturing the frames 0 and 1 include a shutter speed, an analog gain and a digital gain and are stored in the frame buffer 130 or the volatile memory 140. The volatile memory 140, such as a DRAM (Dynamic Random Access Memory), for storing necessary data in execution, such as runtime variables, data tables, etc. Another LDR frame is a low-exposure frame, referred to hereinafter as the frame 2. Yet another LDR frame is a high-exposure frame, referred to hereinafter as the frame 3. The processing unit 110 merges the frames 0, 2 and 3 by using an HDRM (High-Dynamic-Range Merging) algorithm to generate an HDR (High Dynamic Range) frame and stores the generated HDR frame in the frame buffer 150. In an embodiment, the output HDR frame is an 18-bit frame.

Figure 2:
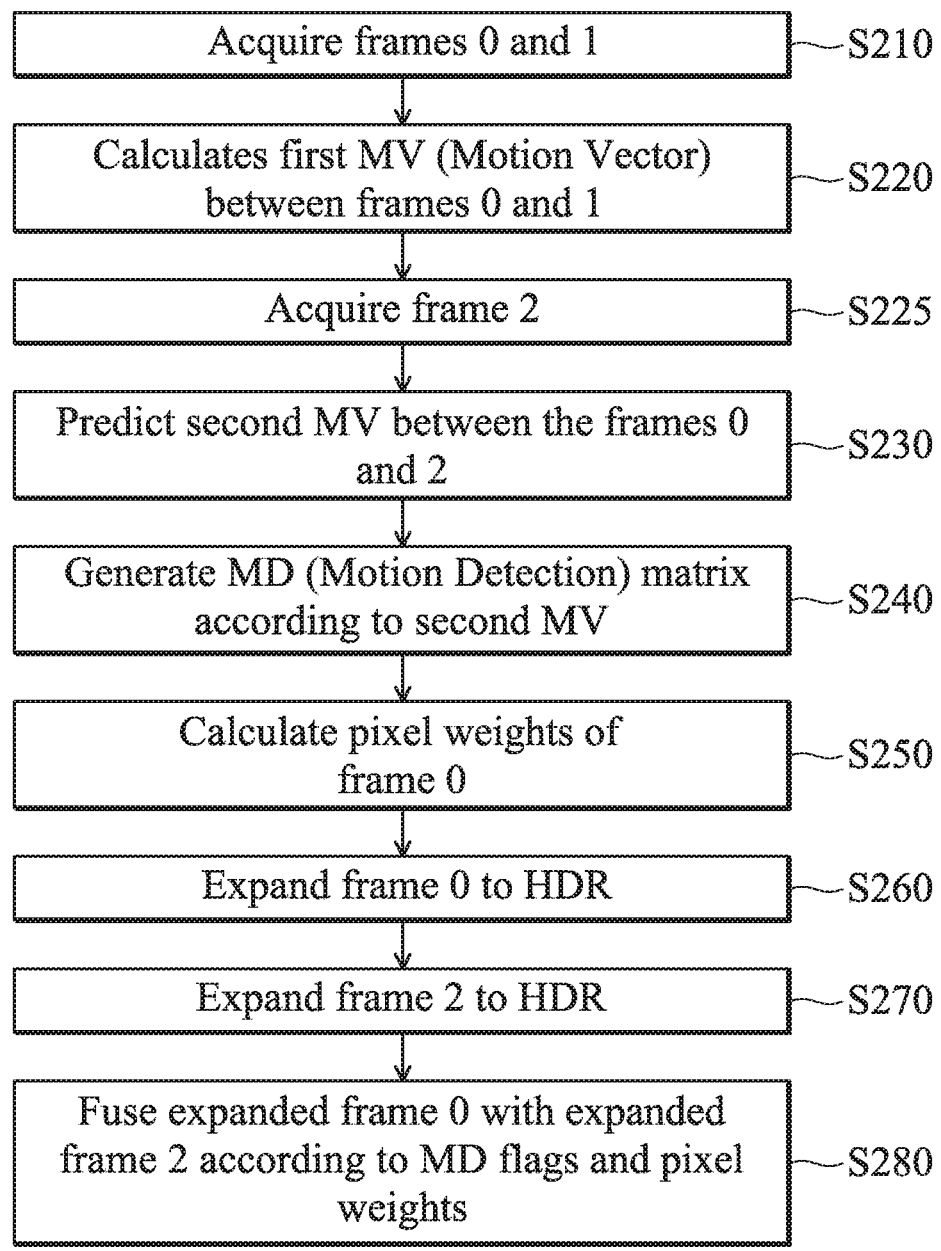
FIG. 2 is a flowchart illustrating a method for generating HDR images, which is performed by a processing unit, according to an embodiment of the invention.

FIG. 2 is a flowchart illustrating a method for generating HDR images, which is performed by a processing unit, according to an embodiment of the invention. The process begins to acquire frames 0 and 1 from the camera module 190 via the camera module controller 190 (step S210). Next, the processing unit 110 calculates the first MV (Motion Vector) between the frames 0 and 1 (step S220). In an example, the processing unit 110 may use the well-known ME (Motion Estimation) algorithm to calculate the first MV. The processing unit 110 acquires the frame 2 from the camera module 190 via the camera module controller 190 (step S225). It should be noted that step S225 may not be executed after step S220. For example, the frame 2 is a low-exposure frame. The processing unit 110 acquires the frame 2 after calculating a low-exposure parameter according to the frame 0. Details will be described in the following paragraphs. Next, the processing unit 110 predicts the second MV between the frames 0 and 2 according to the first MV, the time interval between the shooting moments for the frames 0 and 1 and the time interval between the shooting moments for the frames 0 and 2 (step S230). Next, the processing unit 110 generates the MD (Motion Detection) matrix, in which contains multiple MD flags, according to the second MV (step S240). The processing unit 110 will use the MD flags to fuses the frame 0 with the frame 2. It should be noted that, in some embodiments, the fusing of the frame 0 with the frame 2 may only take the MD flags into account. Alternatively, the fusing may further take the pixel weights into account. The exemplary process may be illustrated as follows: The processing unit 110 further calculates multiple pixel weights of the frame 0 (step S250), expands the frame 0 to HDR (step S260) and expands the frame 2 to HDR (step S270). Finally, the processing unit 110 fuses the expanded frame 0 with the expanded frame 2 according to the MD flags and the pixel weights (step S280).

Figure 3A:
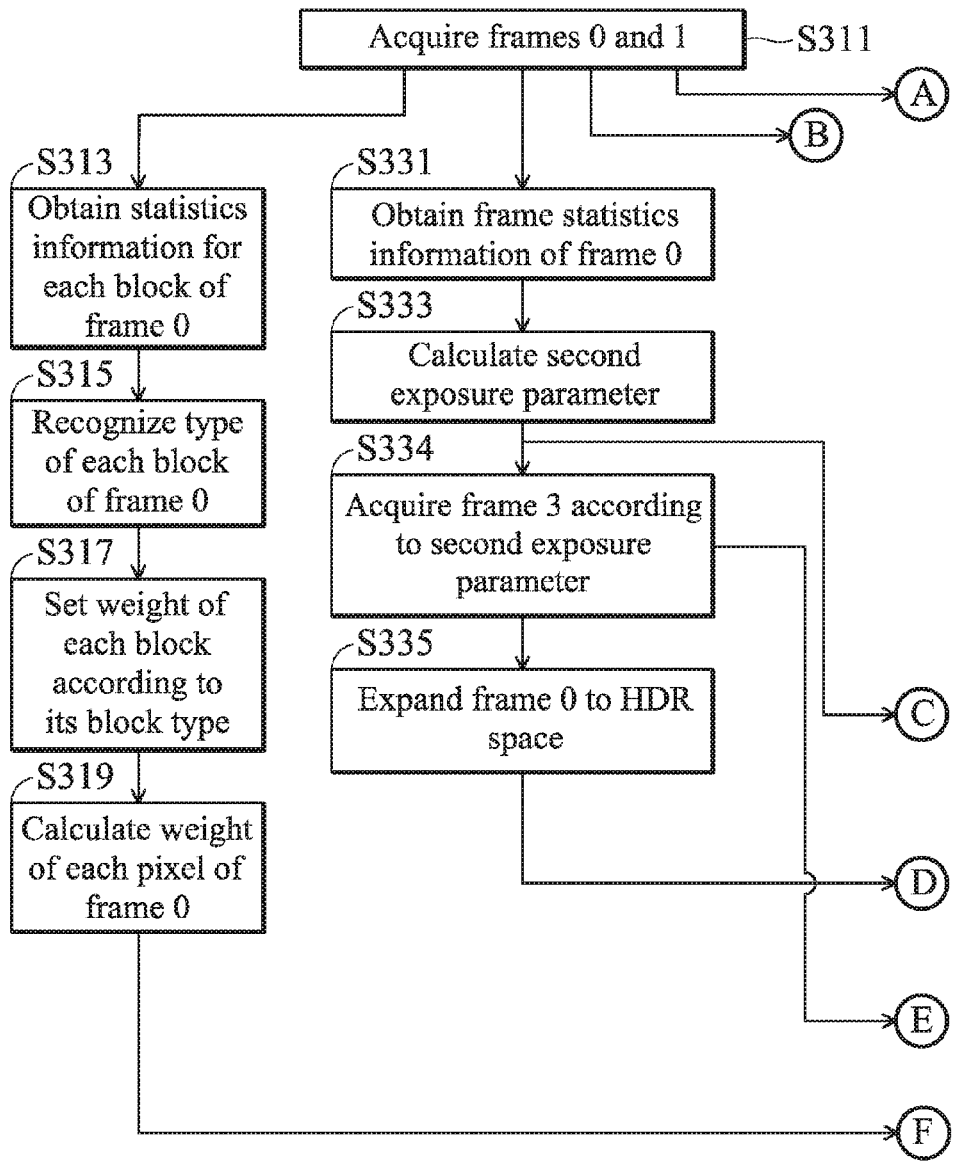
FIGS. 3A and 3B are flowcharts illustrating a method for generating HDR images, which is performed by a processing unit, according to an embodiment of the invention.
Figure 3B:
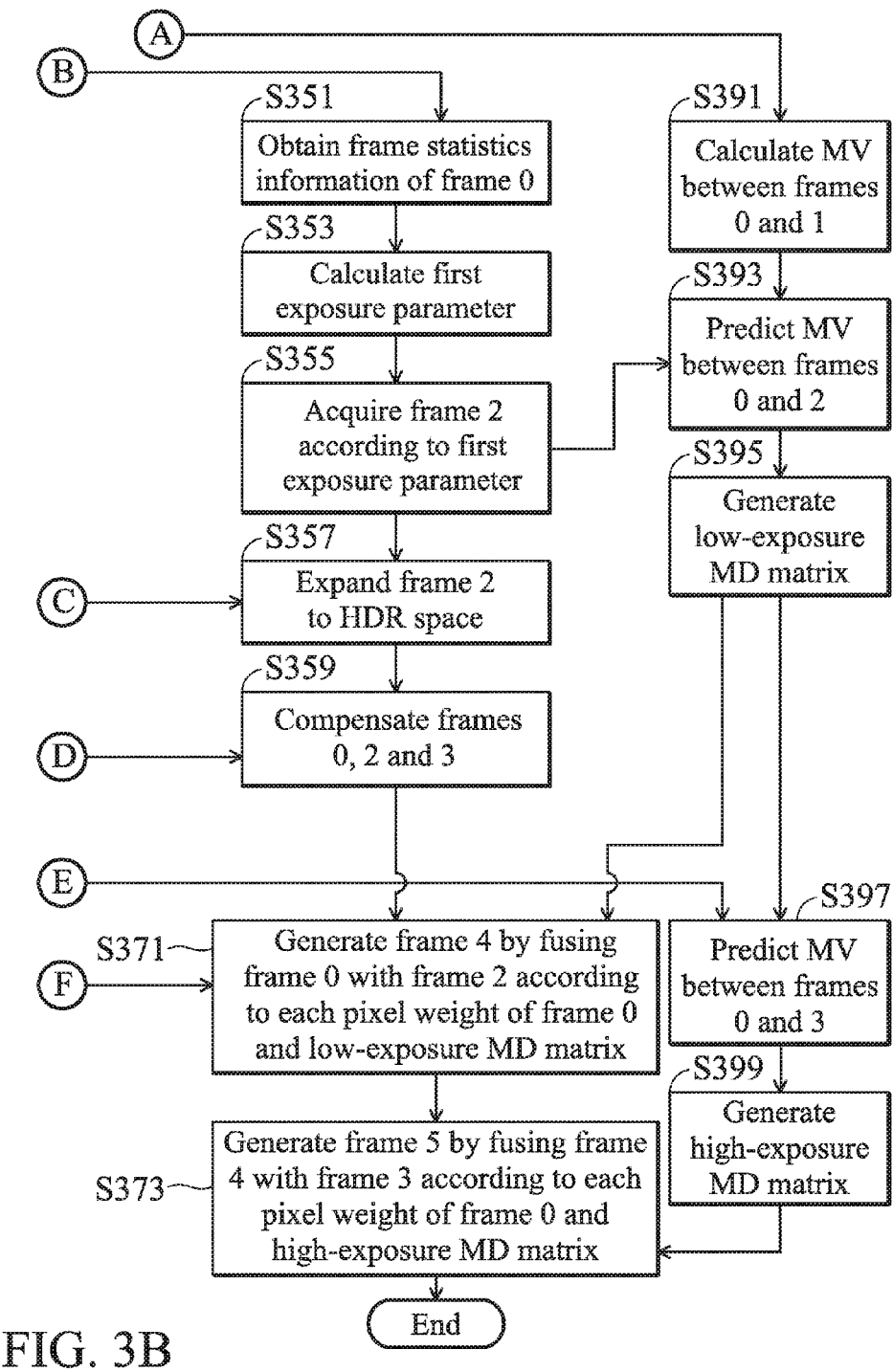
Figure 4:
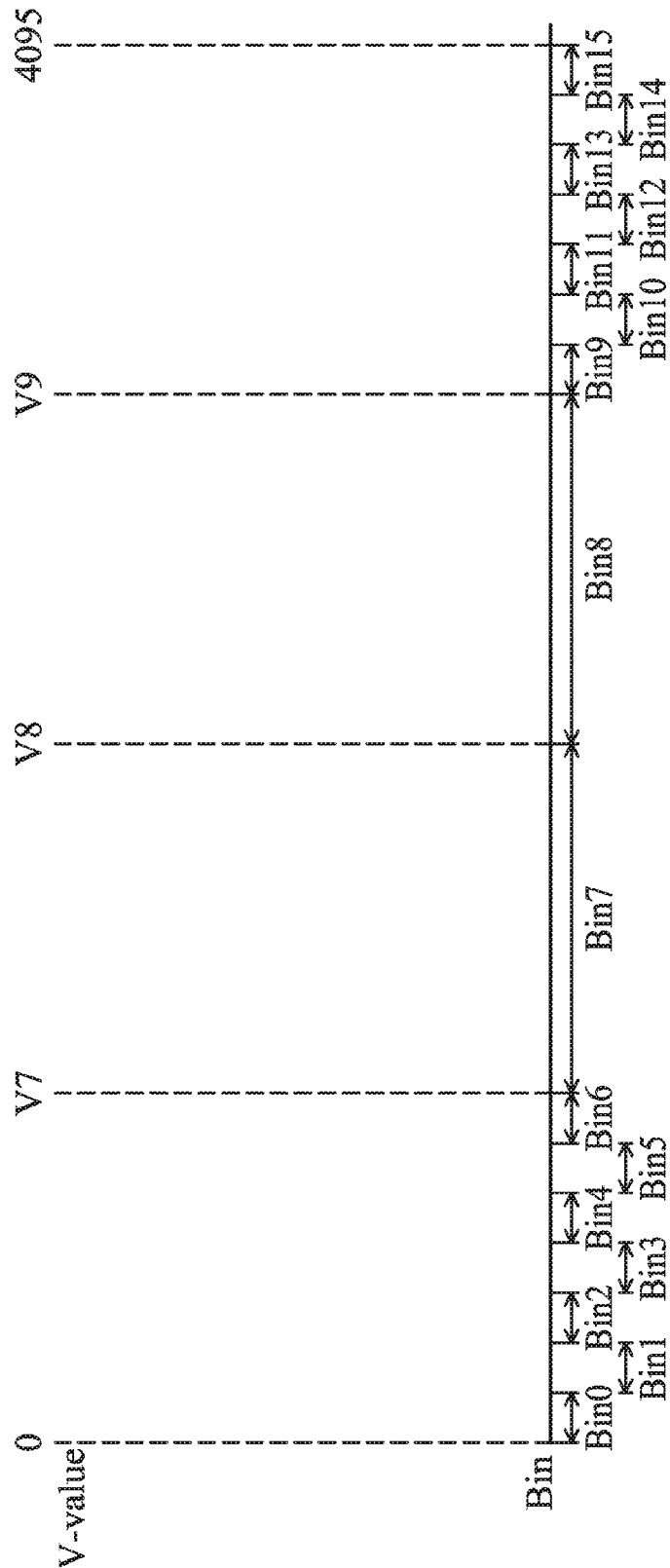
FIG. 4 is a schematic diagram of a luminance histogram for a block according to an embodiment of the invention.

FIGS. 3A and 3B are flowcharts illustrating a method for generating HDR images, which is performed by a processing unit, according to an embodiment of the invention. The process begins to acquire frames 0 and 1 from the frame buffer 130 (step S311). Next, the processing unit 110 obtains statistics information for each block of the frame 0 (step S313). Specifically, the frame 0 may be divided into m×n blocks and each block contains, for example, 16×16 or 32×32 pixels, and a luminance value of each pixel is calculated. The luminance value of each pixel may be calculated using the Equation:

$$V = 0.3 \times R + 0.6 \times G + 0.1 \times B \tag{1}$$

where R indicates a red value, G indicates a green value, B indicates a blue value and V indicates a luminance value. The processing unit 110 calculates an average luminance AveLum and a luminance histogram of each block. FIG. 4 is a schematic diagram of a luminance histogram for a block according to an embodiment of the invention. Although the embodiments give 12-bit luminance values ranging from 0 to 4095 as an example, the invention should not be limited thereto. The histogram is divided into, for example, 16 bins, and the minimum luminance value V8 of Bin8 is set to 2047.5(=4095/2). The minimum luminance values V7 of Bin7 and V9 of Bin9 may be calculated using Equations:

$$V7 = 4095 \times r \tag{2}$$

$$V9 = 4095 \times (1-r) \tag{3}$$

where r may be an arbitrary value between 0 and 0.5. Assume that r is set to 0.25: V7 is 1023.75 and V9 is 3071.25. The luminance values between 0 and V7 are divided into seven bins (Bin0~Bin6) equally and the luminance values between V9 and 4095 are divided into seven bins (Bin9~Bin15). The luminance values of the $8^{th}$ bin (Bin7) range from V7 to V8 and the luminance values of the $9^{th}$ bin (Bin8) range from V8 to V9. In each block, the processing unit 110 distributes each pixel to a corresponding bin according to its luminance value and counts how many pixels are presented in each bin. Exemplary pseudo code for generating the histogram is as follows:

```
LowThr = 4096 >> 2; // LowThr = maximum_12bits * 0.25
HighThr = 4096 - LowThr;
valuePerBin = (LowThr / (blockBinNum/ 2 - 1)); // blockBinNum = 16
//for each block
for(byIdx = 0; byIdx < block_cnt_y; byIdx ++) {
   for(bxIdx = 0; bxIdx < block_cnt_x; bxIdx ++) {
      lum = image->y[pxlIdx];
      sum += lum;
      if (lum < LowThr) { // (Bin 0~6)
         bin = ((unsigned short)(lum * (((blockBinNum >> 1) - 1) <<
            2)) >> 12); }
         else if (lum < (maximum_12bits + 1) / 2) { // (Bin 7)
            Bin = ( blockEntryNum / 2 - 1); }
```

-continued

```
    else if (lum < HighThr) { // (Bin 8)
        Bin = ( blockEntryNum / 2); }
    else { // (Bin 9~15)
        tmpLum = lum – HighThr;
        tmpBin = ((unsigned short)(tmpLum * (((blockBinNum >>
1) – 1) << 2)) >> 12);
        if (tmpBin >= ((blockBinNum >> 1) –1)){
            bin = blockBinNum – 1;}
        else  {
            bin = (blockBinNum >> 1) + 1 + tmpBin;} }
    bestExpBlockInfor[curLumSumIdx].block_hist[Bin]++; }
    bestExpBlockInfor[curLumSumIdx].block_averVal = sum / block_
size; }
``` where bestExpBlockInfor is a structure array and each structure stores statistics information of one block, which includes a luminance average block_averVal and pixel counts of Bin0 to Bin15 block_hist[Bin].

Subsequently, the processing unit 110 recognizes that each block is the low-exposure type, the normal-exposure type or the high-exposure type according to statistics information obtained by analyzing the luminance average and the histogram of the block (step S315). Specifically, a low-bin threshold and a high-bin threshold within the histogram of one block are calculated. The low-bin threshold and the high-bin threshold may be calculated using the Equations:

$$threBinLow \approx (BinNum/2-1)/r \times 0.18 \quad (4)$$

$$threBinHigh \approx BinNum-(BinNum/2-1)/r \times 0.18 \quad (5)$$

where threBinLow indicates a low-bin threshold, threBinHigh indicates a high-bin threshold, BinNum indicates a total number of bins within the histogram of the block, for example, BinNum=16, and r may be an arbitrary value between 0 and 0.5. Assume that r is set to 0.25: The low-bin threshold is 5 and the high-bin threshold is 11. For each block, pixels falling within Bin0 to Bin5 belong to a dark area while pixels falling within Bin11 to Bin15 belong to a saturated area. For each block, pixNumLow indicating a pixel count of the dark area is accumulated from the Bin0 to Bin5 and pixNumHigh indicating a pixel count of the saturated area is accumulated from the Bin11 to Bin15. The processing unit 110 recognizes whether the block type is low-exposure, normal-exposure or high-exposure by the following judgments. Any block is labeled as the first type (normal-exposure) if the pixel count of the dark area pixNumLow is not greater than the block-luminance threshold blocklumthres and the pixel count of the saturated area pixNumHigh is not greater than the block-luminance threshold blocklumthres. Any block is labeled as the second type (low-exposure) if the pixel count of the dark area pixNumLow is greater than the block-luminance threshold blocklumthres. Any block is labeled as the third type (high-exposure) if the pixel count of the saturated area pixNumHigh is greater than the block-luminance threshold blocklumthres. In an embodiment, the block-luminance threshold is associated with a total number of pixels within the block, for example, blocklumthres=blocksize*ratio. In another embodiment, the processing unit 110 further provides the low-luminance-average threshold AveLumLow (for example, 256) and the high-luminance-average threshold AveLumHigh (for example, 3840). Any block is labeled as the second type (low-exposure) if the luminance average of the block AveLum is less than or equals the low-luminance-average threshold AveLumLow. Any block is labeled as the third type (high-exposure) if the luminance average of the block AveLum is greater than or equals the high-luminance-average threshold AveLumHigh. Any block is labeled as the first type (normal-exposure) if the block has not been labeled as the second type or the third type. Exemplary pseudo code for recognizing each block type is as follows:

```
ThrgridL = 5; // lowlight bin threshold, thrBlockBinL =
((binNum >> 1) – 1) * 0.18 / ratio;
for (x = 0; x < block_cnt_x; x++) {
    for (y = 0; y < block_cnt_y; y++) {
        curblockIdx = y * block_cnt_x +x;//block index
        while (i <= ThrblockL) {
            j = binNum – i;
            blockcntltmp += bestExpBlockInfor[curgIdx].block_hist[i];
//accumulate from low to high
            blockcnthtmp += bestExpBlockInfor[curgIdx].block_hist[j];
// accumulate from high to low
            i++;  }
        curBlockAve = m_pBestExpBlockInfor[curgIdx].block_averVal;
        b_AveLumMin = (maximum_12bits + 1) >> 4; //average low threshold
        b_AveLumMax = (maximum_12bits + 1) – g_KAveLumMin;
//average high threshold
        ThrblockCnt = blockSize * 0.18;//histogram threshold
        //block label is defined by average and histogram of the block
        isUnder = ((Gridcntltmp > thrBlockCnt) && (g_KAveLumMin >=
curBlockAve));
        isOver = ((Gridcnthtmp > thrBlockCnt) && (g_KAveLumMax <=
curBlockAve));
        if (isUnder && isOver) { // is over and is under
            blockLabel[curblockIdx] = NORMAL; }// NORMAL = 1
        else if (isUnder) { // is under
            blockLabel[curblockIdx] = LOW; } // LOW = 0
        else if (isOver) { //is over
            blockLabel[curblockIdx] = HIGH; } // HIGH = 2
        else { // is not over and not under
            blockLabel [curblockIdx] = NORMAL;}}}
``` where blockLabel is an array, in which each cell stores one type of block, such as the low-exposure "LOW", the normal-exposure "NORMAL" and the high-exposure "HIGH". In some embodiments, those skilled in the art may devise the design to take both the pixel count of the dark or saturated area and the luminance average of the block AveLum into account. For example, any block is labeled as the low-exposure type if the pixel count of the dark area pixNumLow is greater than the block-luminance threshold blocklumthres and the luminance average of the block AveLum is less than or equals the low-luminance-average threshold AveLumLow. Any block is labeled as the high-exposure type if the pixel count of the saturated area pixNumHigh is greater than the block-luminance threshold blocklumthres and the luminance average of the block AveLum is greater than or equals the high-luminance-average threshold AveLumHigh. Any block is labeled as the normal-exposure type if the block has not been labeled as the low-exposure type or the high-exposure type.

Figure 6:
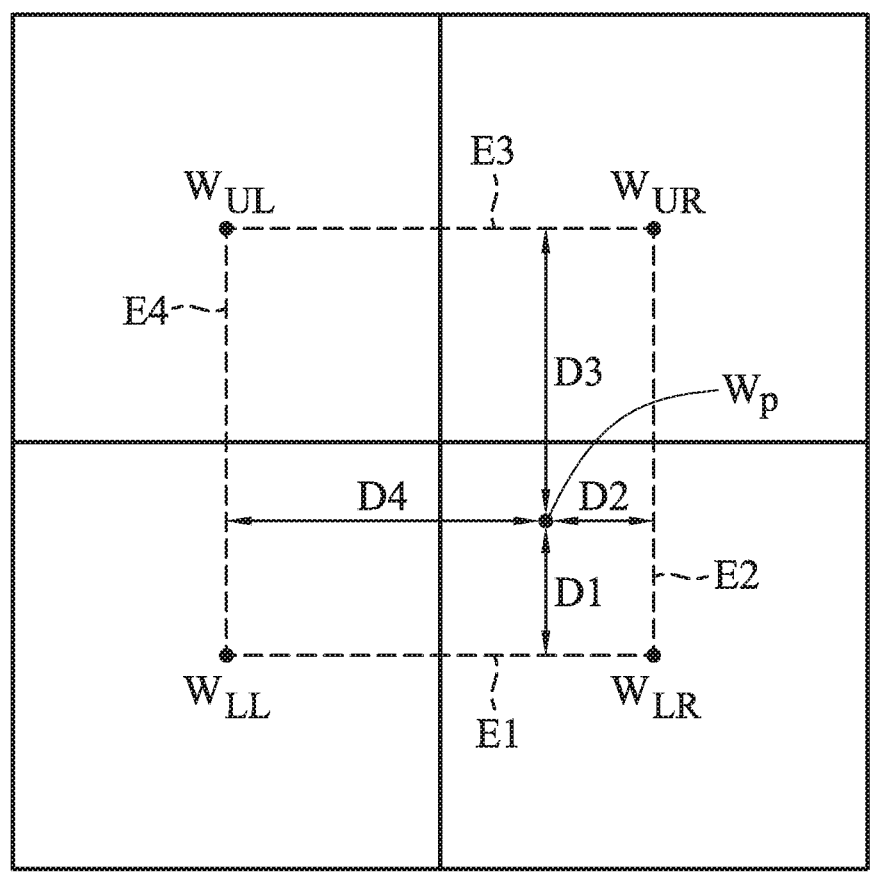
FIG. 6 is a schematic diagram illustrating four surrounding blocks according to an embodiment of the invention.

Subsequently, the processing unit 110 sets the weight of each block (also referred to as the block weight) according to its block type (step S317) and calculates the weight of each pixel of the frame 0 (also referred to as the pixel weight) (step S319). In step S317, specifically, the block weight is set to 0 when the block is labeled as the low-exposure type; the block weight is set to 1 when the block is labeled as the normal-exposure type; and the block weight is set to 2 when the block is labeled as the high-exposure type. Specifically, in step S319, except for pixels located at the boundary and the corner of blocks, the processing unit 110 calculates each pixel weight of the frame 0 according to the four weights of the surrounding blocks and distances from the pixel to the four centers of the surrounding blocks. FIG. 6 is a schematic diagram illustrating four surrounding blocks according to an embodiment of the invention. The rectangle is formed by four center points of surrounding blocks $W_{UL}$, $W_{UR}$, $W_{LL}$ and $W_{LR}$ and includes four edges E1 to E4. Each pixel weight $W_p$ may be calculated using the Equation:

$$W_p = D1 \times D2 \times W_{UL} + D1 \times D4 \times W_{UR} + D3 \times D2 \times W_{LL} + D3 \times D4 \times W_{LR} \quad (6)$$

where $W_{UL}$ indicates the block weight of the upper-left block, $W_{UR}$ indicates the block weight of the upper-right block, $W_{LL}$ indicates the block weight of the lower-left block, $W_{LR}$ indicates the block weight of the lower-right block, D1 indicates the distance from the pixel p to the lower edge E1, D2 indicates the distance from the pixel p to the right edge E2, D3 indicates the distance from the pixel p to the upper edge E3 and D4 indicates the distance from the pixel p to the left edge E4. Each pixel weight $W_p$ of the frame 0 calculated in step S319 is further normalized (for example, being divided into the block size to produce the normalized value between 0 and 1) and will be used in the fusion process of the frame 0 with the frames 2 and 3. Details are to be described in the following paragraphs. Although the embodiments describe the process for calculating each pixel weight of the frame 0 as shown in steps S313 to S319, those skilled in the art may employ other methods to calculate each pixel weight of the frame 0 and the invention should not be limited thereto.

Figure 5:
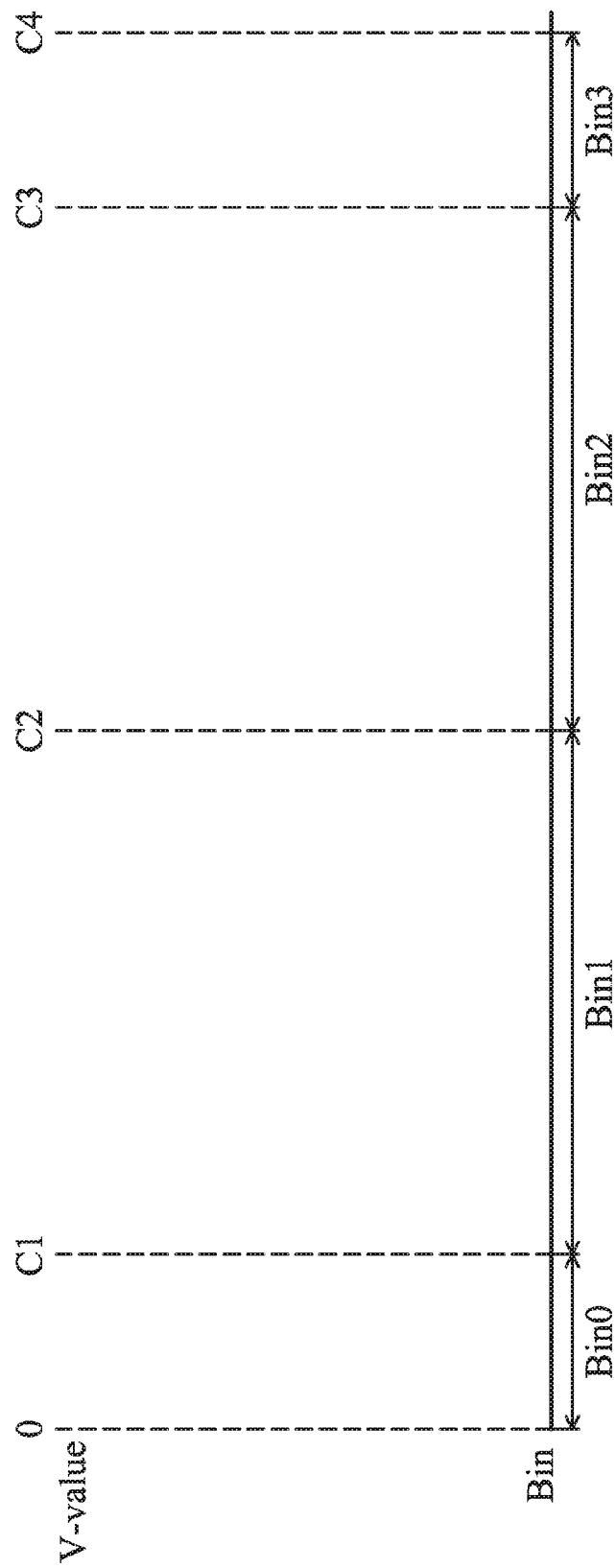
FIG. 5 is a schematic diagram of a luminance histogram for the frame 0 according to an embodiment of the invention.

Now refer back to the initial step S311 of FIG. 3A. After acquiring the frame 0 (step S311), the processing unit 110 obtains statistics information of the frame 0 (steps S351 and S331). In step S311, the processing unit 110 may convert color space of RGB into that of HSV. Specifically, in steps S351 and S331, the processing unit 110 calculates a histogram of the frame 0. FIG. 5 is a schematic diagram of a luminance histogram for the frame 0 according to an embodiment of the invention. Luminance values of the dark area (Bin0) ranges from 0 to C1 while luminance values of the saturated area (Bin3) ranges from C3 to C4. Although the embodiments give 12-bit luminance values ranging from 0 to 4095 as an example with C1=511, C3=3583 and C4=4095, the invention should not be limited thereto. For the overall frame 0, the processing unit 110 counts how many pixels are presented in each area and calculates a ratio of a first pixel count included in the dark area (also referred to as a dark-pixel count) over a second pixel count included in the saturated area (also referred to as a saturate-pixel count), denoted as shiftRation. The ratio may be calculated using the Equation:

$$\text{shiftRatio} = \text{pixelNumBin0}/\text{pixelNumBin3} \quad (7)$$

where pixelNumBin0 indicates the first pixel count of the dark area and pixelNumBin3 indicates the second pixel count of the saturated area. Next, the processing unit 110 calculates an expansion multiplier exp_times according to the ratio of the first pixel count over the second pixel count. When the ratio of the dark-pixel count over the saturate-pixel count is less than 8, the Equation (8) may be used to calculate the expansion multiplier exp_times. When the ratio of the dark-pixel count over the saturate-pixel count is greater than or equals to 8, the Equation (9) may be used to calculate the expansion multiplier exp_times.

$$\text{exp\_times} = a \times \text{shiftRatio} \times \text{shiftRatio} + b \times \text{shiftRatio} + c \quad (8)$$

$$\text{exp\_times} = d \times \text{shiftRatio} \times \text{shiftRatio} + e \times \text{shiftRatio} + f \quad (9)$$

where a, b, c, d, e and f are floating numbers. Subsequently, the processing unit 110 calculates the first exposure parameter required for processing frame 2 (step S353) and the second exposure parameter required for processing frame 3 (step S333) according to the ratio shiftRatio derived from the statistics information of the frame 0 and exposure settings of the frame 0. The exposure settings include a shutter speed (denoted as sht), an analog gain (denoted as ag) and a digital gain (denoted as dg). The exposure settings may be a multiplier of sht, ag and dg. The first exposure parameter Para1 and the second exposure parameter Para2 may be calculated using Equations:

$$\text{Para1} = sht \times ag \times dg \times \text{exp\_times}/\text{expValue} \quad (10)$$

$$\text{Para2} = sht \times ag \times dg \times \text{exp\_times} \quad (11)$$

where expValue indicates a fixed expansion value being a ratio of the second exposure parameter over the first exposure parameter. In an embodiment of expanding and fusing 12-bit LDR frames to generate an 18-bit HDR frame, expValue=64.

After calculating the second exposure parameter Para2 (step S333), the processing unit 110 acquires the frame 3 according to the second exposure parameter Para2 (step S334) and expands the frame 0 to HDR space (step S335). In step S335, the exemplary pseudo code used for calculating the first expansion factor of the frame 0 is as follows:

curveMapValNormal=curveTable_AVR[0]×sht×ag×dg+curveTable_AVR[1];

curveMapValHigh=curveTable_AVR[0]×Para2+curveTable_AVR[1];

slope_Normal=curveMapValHigh/curveMapValNormal;

where slope_Normal indicates the first expansion factor of the frame 0, curveTable_AVR[0] is the calibrated slope associated with the image sensor of the camera module 190, curveTable_AVR[1] is the calibrated y-intercept associated with the image sensor of the camera module 190, sht×ag×dg indicates the exposure settings of the frame 0 (where sht indicates the shutter speed of the frame 0, ag indicates the analog gain of the frame 0 and dg indicates the digital gain of the frame 0) and Para2 indicates the second exposure parameter calculated using Equation (11). The processing unit 110 multiplies the HSV value of each pixel in the frame 0 with the first expansion factor slope_Normal to expand the frame 0 to the HDR space. Although the embodiments describe the process for expanding the frame 0 to the HDR space as shown in steps S331 to S335, those skilled in the art may employ other methods to expand the frame 0 to the HDR space and the invention should not be limited thereto.

After calculating the first exposure parameter Para1 (step S353), the processing unit 110 acquires the frame 2 according to the first exposure parameter Para1 (step S355). In addition, after calculating the first exposure parameter Para1 (step S353) and the second exposure parameter Para2 (step S333), the processing unit 110 expands the frame 1 to the HDR space (step S357). In step S357, the exemplary pseudo code used for calculating the second expansion factor is as follows:

curveMapValLow=curveTable_AVR[0]×Para1+curveTable_AVR[1];

curveMapValHigh=curveTable_AVR[0]×Para2+curveTable_AVR[1];

slope_Low=curveMapValHigh/curveMapValLow;

where slope_Low indicates the second expansion factor of the frame 2, curveTable_AVR[0] is the calibrated slope associated with the image sensor of the camera module 190, curveTable_AVR[1] is the calibrated y-intercept associated with the image sensor of the camera module 190, Para1 indicates the first exposure parameter calculated in step S353 according to Equation (10) and Para2 indicates the second exposure parameter calculated in step S333 according to Equation (11). The processing unit 110 multiplies the HSV value of each pixel in the frame 2 with the second expansion factor slope_Low to expand the frame 2 to the HDR space. Although the embodiments describe the process for expanding the frame 2 to the HDR space as shown in steps S331 to S357, those skilled in the art may employ other methods to expand the frame 2 to the HDR space and the invention should not be limited thereto.

Figure 7:
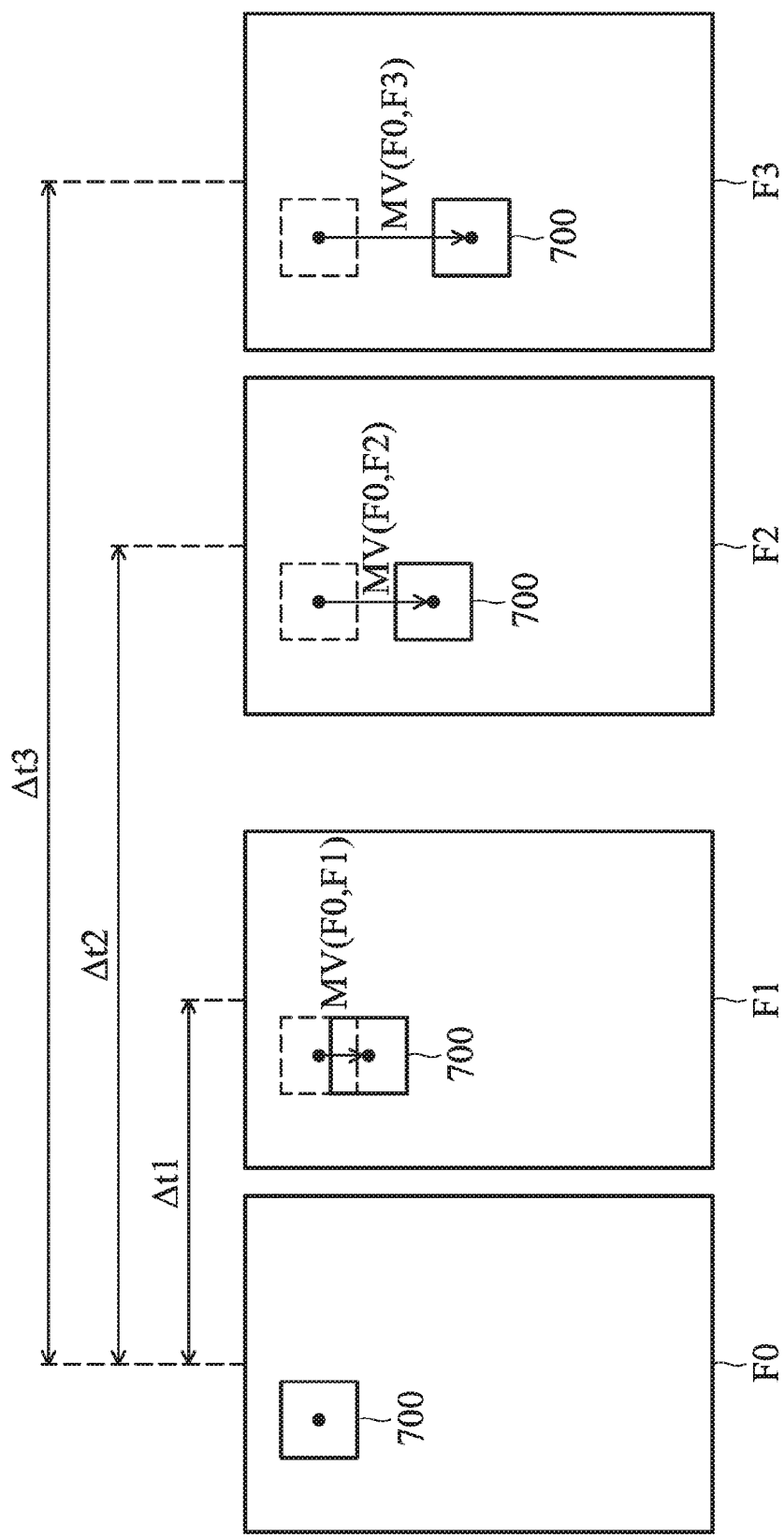
FIG. 7 is a schematic diagram illustrating the MV (Motion Vector) predictions between the frames 0 and 2 and between the frames 0 and 3.
Figure 8:
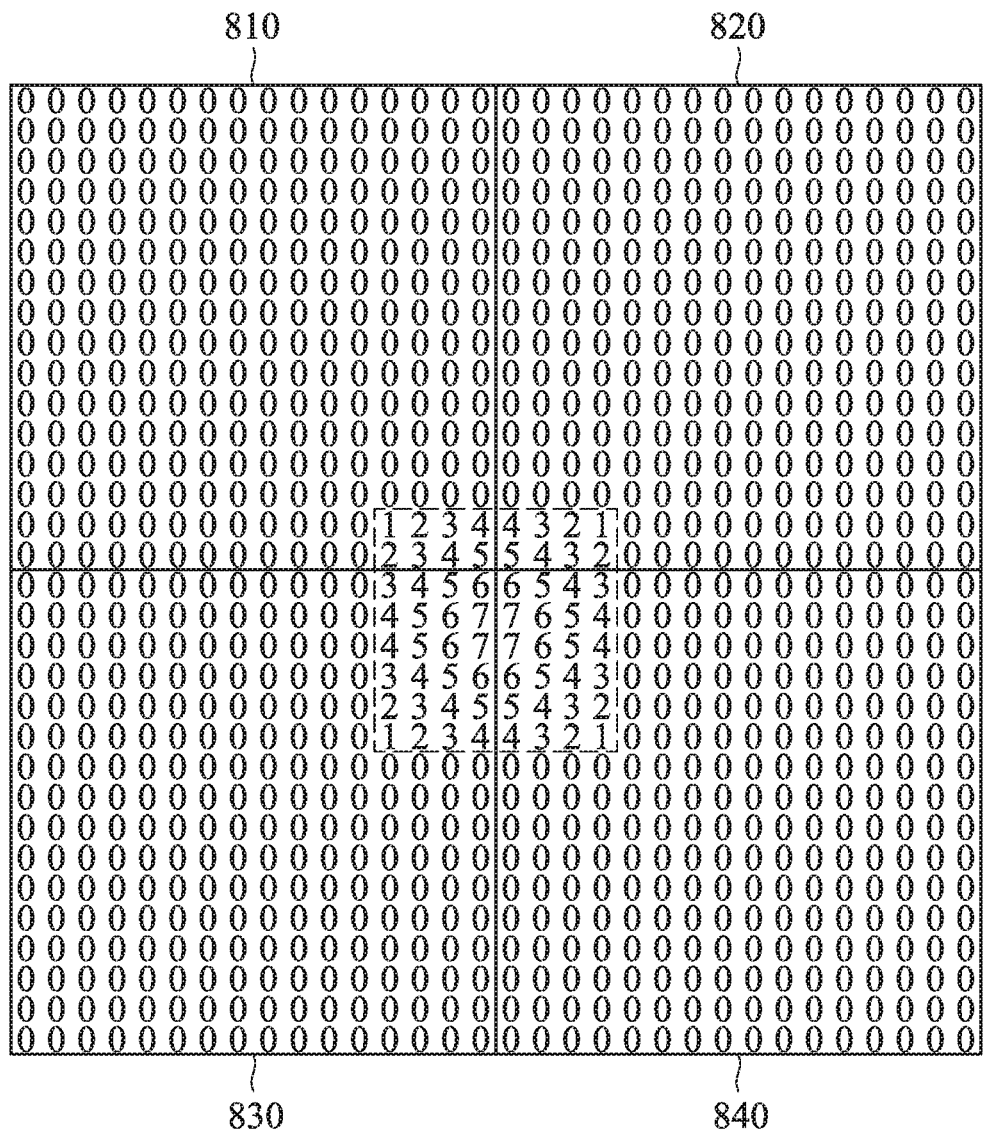
FIG. 8 is a schematic diagram illustrating a portion of the low-exposure MD matrix according to an embodiment of the invention.
Figure 9:
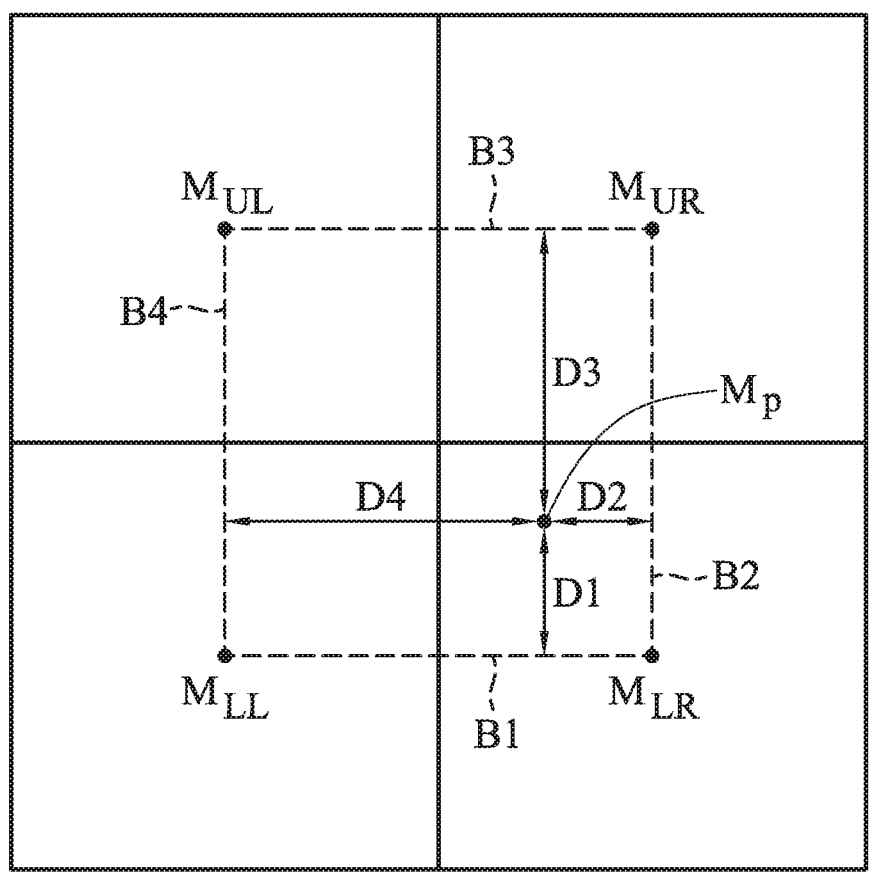
FIG. 9 is a schematic diagram illustrating four surrounding blocks according to an embodiment of the invention.

Now refer back to the initial step S311 of FIG. 3A. In addition to the frame 0, the processing unit 110 acquires the frame 1, which is shot under the best exposure conditions, from the frame buffer 130. Subsequently, the processing unit 110 calculates the MV (Motion Vector) between the frames 0 and 1 (step S391). In step 391, the processing unit 110 may employ the well-known MV prediction algorithm for the calculation. The processing unit 110 predicts the MV between the frames 0 and 2 according to the MV between the frames 0 and 1, the time interval between the shooting moments of frames 0 and 1 and the time interval between the shooting moments of frames 0 and 2 (step S393). The MV prediction between the frames 0 and 2 may be calculated using the Equation:

$$MV(F0,F2)=MV(F0,F1)\times \Delta t2/\Delta t1 \quad (12)$$

where MV(F0,F1) indicates the MV between the frames 0 and 1, $\Delta t1$ indicates the time interval between the shooting moments of frames 0 and 1, $\Delta t2$ indicates the time interval between the shooting moments of frames 0 and 2 and MV(F0,F2) indicates the MV between the frames 0 and 2. FIG. 7 is a schematic diagram illustrating the MV predictions between the frames 0 and 2 and between the frames 0 and 3. Assume that MV(F0,F1) is the MB (Macro Block) 700 of the frame 0 F0, which, on the frame 1, moves downward by 10 pixels and $\Delta t2$ is three times of $\Delta t1$: The predicted MV(F0,F2) between the frames 0 and 2 indicates the downward movement by 30 pixels. The MB 700 may include p×p pixels, such as 8×8, 16×16 pixels, etc., depending on the sizes and the quantities of the in-motion subjects between the frames 0 and 2. The processing unit 110 generates the low-exposure MD (Motion Detection) matrix according to the MV(F0,F2) between the frames 0 and 2 (step S395). The low-exposure MD matrix includes multiple MD flags and each of which corresponds to one pixel of the frame 0 and is a value ranging from 0 to 7 to indicate the movement probability of this pixel. The value "0" indicates that this pixel of the MB does not move to this position while the value "7" indicates that the probability for the movement of this pixel of the MB to this position is very high. In step S395, specifically, in initial, all MD flags of the low-exposure MD matrix are set to 0s. The processing unit 110 projects the motion MB of the frame 0 to the corresponding motion positions on the frame 2 according to the predicted MV(F0,F2) between the frames 0 and 2 and overwrites initial MD flags at the motion positions of the low-exposure MD matrix, which corresponds to each motion MB, with the predefined pattern. The center of the predefined pattern is set to 7 and the other values of predefined pattern are outward decreased from the center until 1. Exemplary 8×8 matrix for the predefined pattern is as follows:
{1,2,3,4,4,3,2,1},
{2,3,4,5,5,4,3,2},
{3,4,5,6,6,5,4,3},
{4,5,6,7,7,6,5,4},
{4,5,6,7,7,6,5,4},
{3,4,5,6,6,5,4,3},
{2,3,4,5,5,4,3,2},
{1,2,3,4,4,3,2,1}, Exemplary 16×16 matrix for the predefined pattern is as follows:
{1,1,2,2,3,3,4,4,4,4,3,3,2,2,1,1},
{1,1,2,2,3,3,4,4,4,4,3,3,2,2,1,1},
{2,2,3,3,4,4,5,5,5,5,4,4,3,3,2,2},
{2,2,3,3,4,4,5,5,5,5,4,4,3,3,2,2},
{3,3,4,4,5,5,6,6,6,6,5,5,4,4,3,3},
{3,3,4,4,5,5,6,6,6,6,5,5,4,4,3,3},
{4,4,5,5,6,6,7,7,7,7,6,6,5,5,4,4},
{4,4,5,5,6,6,7,7,7,7,6,6,5,5,4,4},
{4,4,5,5,6,6,7,7,7,7,6,6,5,5,4,4},
{4,4,5,5,6,6,7,7,7,7,6,6,5,5,4,4},
{3,3,4,4,5,5,6,6,6,6,5,5,4,4,3,3},
{3,3,4,4,5,5,6,6,6,6,5,5,4,4,3,3},
{2,2,3,3,4,4,5,5,5,5,4,4,3,3,2,2},
{2,2,3,3,4,4,5,5,5,5,4,4,3,3,2,2},
{1,1,2,2,3,3,4,4,4,4,3,3,2,2,1,1},
{1,1,2,2,3,3,4,4,4,4,3,3,2,2,1,1}, FIG. 8 is a schematic diagram illustrating a portion of the low-exposure MD matrix according to an embodiment of the invention. Assume that, in step S313, the frame 0 is divided into multiple blocks each including 16×16 pixels and, in step S391, the motion MB includes 8×8 pixels. Exemplary low-exposure MD matrix includes four blocks 810 to 840 and shows the MB 700 moving to the center of the blocks 810 to 840. It should be noted that the start and end coordinates of the blocks 810 to 840 aligns with 16 or the multiplication of 16 and the size of the motion MB 700 depends on the size of the in-motion subject, and the invention should not be limited thereto. The processing unit 110 calculates the MD-flag representative for each block. The MD-flag representative may be the maximum or the average of the MD flags in each block of the blocks 810 to 840. In some embodiments, the processing unit 110 subsequently processes the MD-flag representative of each block using the block-based Gaussian filter. After that, except for the pixels of the border and corner blocks, the processing unit 110 calculates final MD flags of each pixel of the low-exposure MD matrix according to the MD-flag representatives of the four surrounding blocks and the distances from the four surrounding blocks. Those skilled in the art may realize that the motion MB 700 may be moved to a position within one block or between two blocks, and the invention should not be limited thereto. In this embodiment, the purpose of calculating the MD-flag representatives is to convert initial MD flags in pixel-based into MD-flag representatives in block-based. The final MD flags in pixel-based are generated by interpolating the MD-flag representatives in block-based and used to update the MD flags so as to smooth the MD flags of the MB border. FIG. 9 is a schematic diagram illustrating four surrounding blocks according to an embodiment of the invention. The rectangle is formed by four center points of surrounding blocks $M_{UL}$, $M_{UR}$, $M_{LL}$ and $M_{LR}$ and includes four edges B1 to B4. Each final MD flag $M_p$ may be calculated using the Equation:

$$M_p = D1 \times D2 \times M_{UL} + D1 \times D4 \times M_{UR} + D3 \times D2 \times M_{LL} + D3 \times D4 \times M_{LR} \quad (13)$$

where $M_{UL}$ indicates the MD-flag representative of the upper-left block, $M_{UR}$ indicates the MD-flag representative of the upper-right block, $M_{LL}$ indicates the MD-flag representative of the lower-left block, $M_{LR}$ indicates the MD-flag representative of the lower-right block, D1 indicates the distance from the pixel p to the lower edge B1, D2 indicates the distance from the pixel p to the right edge B2, D3 indicates the distance from the pixel p to the upper edge B3 and D4 indicates the distance from the pixel p to the left edge B4. Each $M_p$ is further normalized (for example, being divided into the block size multiplying 7 to produce the normalized value between 0 and 1) and will be used in the subsequent fusion process. Details are to be described in the following paragraphs.

The processing unit 110 predicts the MV between the frames 0 and 3 according to the MV between the frames 0 and 1, the time interval between the shooting moments of frames 0 and 1 and the time interval between the shooting moments of frames 0 and 3 (step S397). The processing unit 110 generates the high-exposure MD matrix according to the MV between the frames 0 and 3 (step S399). Details of steps S397 and S399 may refer to the descriptions recited in steps S939 and 395 with relevant modification to generate the final MD flag for each pixel of the high-exposure MD matrix.

Now refer back to steps S335 and S357 of FIGS. 3A and 3B. In step S359, the expanded frame 0, the expanded frame 2, and the frame 3 acquired by step S334 are compensated. Specifically, the processing unit 110 compensates for saturated pixels and dark pixels of the expanded frame 0 using a first exposure compensation method. The first exposure compensation method detects dark pixels of the expanded frame 0 (those whose luminance values fall within 0 to 128× slope_Normal, for example) and replaces the luminance values of the detected dark pixels of the expanded frame 0 with luminance pixel values of the frame 3 at the same positions. The first exposure compensation method further detects saturated pixels of the expanded frame 0 (those whose luminance values fall within 3967× slope_Normal to 4095, for example) and replaces the luminance values of the detected saturated pixels of the expanded frame 0 with luminance pixel values of the frame 2 at the same positions. Moreover, the processing unit 110 compensates dark pixels of the expanded frame 2 using a second exposure compensation method. Specifically, the second exposure compensation method detects dark pixels of the expanded frame 2 (those whose luminance values fall within 0 to 128× slope_Low, for example) and replaces the luminance values of the detected dark pixels of the expanded frame 2 with luminance pixel values of the frame 0 at the same positions. Furthermore, the processing unit 110 compensates saturated pixels of the frame 3 using a third exposure compensation method. Specifically, the third exposure compensation method detects saturated pixels of the frame 3 (those whose luminance values fall within 3967 to 4095, for example) and replaces the luminance values of the detected saturated pixels of the frame 3 with luminance pixel values of the frame 0 at the same positions. The aforementioned exposure compensation methods are shown as examples and the invention should not be limited thereto. In some embodiments, different methods may be employed to realize the compensation to the expanded frames 0 and 2 and the frame 3. In other embodiments, the exposure compensation recited in step S359 may be omitted while the frame 0 with the normal-exposure and the frame 2 with the low-exposure are expanded to HDR space.

The processing unit 110 generates the frame 4 by fusing the frame 0 with the frame 2 according to the pixel weight of each pixel of the frame 0 calculated in step S319 and the corresponding MD flag of the low-exposure MD matrix calculated in step S395 and stores the frame 4 in the frame buffer 150 (step S371). In an embodiment, the processing unit 110 fuses the HSV values of this pixel of the expanded and compensated frame 0 with the HSV values of the compensated frame 2 at the same position to generate HSV values of the frame 4 at the same position. The HSV-value fusion for any pixels of the frames 0 and 2 may be calculated using the Equations:

$$\text{Final\_fusion\_factor} = \text{MD\_flag\_0} \times 1.0 + (1 - \text{MD\_flag\_0}) \times W_p \quad (14)$$

$$\text{pixel\_4} = \text{pixel\_0} \times \text{Final\_fusion\_factor} + \text{pixel\_2} \times (1 - \text{Final\_fusion\_factor}) \quad (15)$$

where $W_p$ indicates the weight of the p-th pixel, MD_flag_0 indicates the normalized MD flag of the low-exposure MD matrix, pixel_0 indicates the HSV value of the p-th pixel of the expanded and compensated frame 0 and pixel_2 indicates the HSV value of the p-th pixel of the expanded and compensated frame 2.

The processing unit 110 generates the frame 5 by fusing the frame 4 with the frame 3 according to the pixel weight of each pixel of the frame 0 calculated in step S319 and the corresponding MD flag of the high-exposure MD matrix calculated in step S399 and stores the frame 5 in the frame buffer 150 (step S373). The frame 5 is the final result of HDR image. In an embodiment, the processing unit 110 fuses the HSV values of this pixel of the frame 4 with the HSV values of the compensated frame 3 at the same position to generate HSV values of the frame 5 at the same position. The HSV-value fusion for any pixels of the frames 4 and 3 may be calculated using the Equations:

$$\text{Final\_fusion\_factor\_1} = \text{MD\_flag\_1} \times 1.0 + (1 - \text{MD\_flag\_1}) \times W_p \quad (16)$$

$$\text{Final\_fusion\_pixel} = \text{pixel\_4} \times \text{Final\_fusion\_factor\_1} + \text{pixel\_3} \times (1 - \text{Final\_fusion\_factor\_1}) \quad (17)$$

where $W_p$ indicates the weight of the p-th pixel, MD_flag_1 indicates the normalized final MD flag of the high-exposure MD matrix, pixel_4 indicates the HSV value of the p-th pixel by fusing relevant pixels of the frames 0 and 2 in step S371, and pixel_3 indicates the HSV value of the p-th pixel of the compensated frame 3.

To sum up, the invention predicts the positions of the in-motion subjects on the frames under abnormal exposure conditions (like the frame 2 under the low-exposure condition and the frame 3 under the high-exposure condition) by employing the information of multiple frames having the in-motion subjects under normal exposure conditions (like the frames 0 and 1) to solve problems wherein the MV cannot be calculated when the in-motion subjects are moved into the low-/high-exposure area with no information. In addition, the invention further employs the MD flags of the motion blocks calculated by using the predicted MVs to participate in the frame fusion of the HDRM process. The pixel value of the normal-exposure frame is preferably taken into consideration if the pixel is predicted to tend to have a motion and the pixel values of the low-/high-exposure frame is preferably taken into consideration if the pixel is predicted to tend to have no motion, so as to eliminate the ghost effect and avoid a split of the in-motion subject positioned at the border of the low-/high-exposure area.

Although the embodiment has been described in FIG. 1 as having specific elements, it should be noted that additional elements may be included to achieve better performance without departing from the spirit of the invention. While the process flows described in FIGS. 2 and 3 include a number of operations that appear to occur in a specific order, it should be apparent that these processes can include more or fewer operations, which can be executed serially or in parallel, e.g., using parallel processors or a multi-threading environment.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for generating HDR (High Dynamic Range) images, performed by a processing unit, the method comprising:
   acquiring a frame 0 and a frame 1;
   calculating a first MV (Motion Vector) between the frame 0 and the frame 1;
   acquiring a frame 2;
   predicting a second MV between the frame 0 and the frame 2 according to the first MV, a time interval between shooting moments of the frames 0 and 1 and a time interval between shooting moments of the frames 0 and 2;
   generating a first MD (Motion Detection) matrix comprising a plurality of first MD flags according to the second MV; and
   fusing the frame 0 with the frame 2 according to the first MD flags.

2. The method of claim 1, further comprising:
   calculating a plurality of pixel weights of the frame 0;
   expanding the frame 0 to HDR (High Dynamic Range); and
   expanding the frame 2 to HDR,
   wherein the step for fusing the frame 0 with the frame 2 according to the first MD flags further comprises:
   fusing the expanded frame 0 with the expanded frame 2 according to the first MD flags and the pixel weights.

3. The method of claim 2, wherein the fusion of the expanded frame 0 with the expanded frame 2 is calculated using an Equation:

$$\text{Final\_fusion\_factor}=\text{MD\_flag\_0}\times 1.0+(1-\text{MD\_flag\_0})\times Wp; \text{ and}$$

$$\text{Final\_fusion\_pixel}=\text{pixel\_0}\times \text{Final\_fusion\_factor}+\text{pixel\_2}\times(1-\text{Final\_fusion\_factor}),$$

wherein Wp indicates the pixel weight, MD_flag_0 indicates the first MD flag of the first MD matrix, pixel_0 indicates a first pixel value of the expanded frame 0 and pixel_2 indicates a second pixel value of the expanded frame 2.

4. The method of claim 1, further comprising:
   acquiring a frame 3;
   predicting a third MV between the frame 0 and the frame 3 according to the first MV, a time interval between shooting moments of the frames 0 and 1 and a time interval between shooting moments of the frames 0 and 3;
   generating a second MD matrix according to the third MV, wherein the second MD matrix comprises a plurality of second MD flags; and
   fusing the frame 3 with the fused result of the frame 0 with the frame 2 according to the second MD flags.

5. The method of claim 4, wherein the frames 0 and 1 are normal-exposure frames, the frame 2 is a low-exposure frame and the frame 3 is a high-exposure frame.

6. The method of claim 1, wherein the calculation of the second MV between the frames 0 and 2 is calculated by an Equation:

$$MV(F0,F2)=MV(F0,F1)\times \Delta t2/\Delta t1,$$

wherein MV(F0,F1) indicates the first MV between the frames 0 and 1, $\Delta t1$ indicates the time interval between the shooting moments of frames 0 and 1, $\Delta t2$ indicates the time interval between the shooting moments of frames 0 and 2 and MV(F0,F2) indicates the second MV between the frames 0 and 2.

7. The method of claim 1, wherein the step for generating a first MD matrix comprising a plurality of first MD flags according to the second MV further comprises:
   setting the first MD flags to 0;
   projecting a motion MB (Macro Block) of the frame 0 to motion positions on the frame 2 according to the second MV; and
   overwriting the first MD flags of the first MD matrix, which correspond to the motion positions, with a predefined pattern.

8. The method of claim 7, wherein the center of the predefined pattern is set to 7 and the other values of predefined pattern are outward decreased from the center until 1.

9. The method of claim 7, wherein the predefined pattern is an 8×8 matrix as follows:
   {1,2,3,4,4,3,2,1},
   {2,3,4,5,5,4,3,2},
   {3,4,5,6,6,5,4,3},
   {4,5,6,7,7,6,5,4},
   {4,5,6,7,7,6,5,4},
   {3,4,5,6,6,5,4,3},
   {2,3,4,5,5,4,3,2},
   {1,2,3,4,4,3,2,1}, or
   a 16×16 matrix as follows:
   {1,1,2,2,3,3,4,4,4,4,3,3,2,2,1,1},
   {1,1,2,2,3,3,4,4,4,4,3,3,2,2,1,1},
   {2,2,3,3,4,4,5,5,5,5,4,4,3,3,2,2},
   {2,2,3,3,4,4,5,5,5,5,4,4,3,3,2,2},
   {3,3,4,4,5,5,6,6,6,6,5,5,4,4,3,3},
   {3,3,4,4,5,5,6,6,6,6,5,5,4,4,3,3},
   {4,4,5,5,6,6,7,7,7,7,6,6,5,5,4,4},
   {4,4,5,5,6,6,7,7,7,7,6,6,5,5,4,4},
   {4,4,5,5,6,6,7,7,7,7,6,6,5,5,4,4},
   {4,4,5,5,6,6,7,7,7,7,6,6,5,5,4,4},
   {3,3,4,4,5,5,6,6,6,6,5,5,4,4,3,3},
   {3,3,4,4,5,5,6,6,6,6,5,5,4,4,3,3},
   {2,2,3,3,4,4,5,5,5,5,4,4,3,3,2,2},
   {2,2,3,3,4,4,5,5,5,5,4,4,3,3,2,2},
   {1,1,2,2,3,3,4,4,4,4,3,3,2,2,1,1},
   {1,1,2,2,3,3,4,4,4,4,3,3,2,2,1,1}.

10. The method of claim 7, further comprising:
    calculating a MD-flag representative for at least one block comprising the pixels at the motion positions; and
    updating the first MD flags of the pixels at the motion positions according to the MD-flag representative.

11. The method of claim 10, wherein the MD-flag representative is the maximum or the average of the first MD flags of the pixels in the block.

12. The method of claim 10, wherein the first MD flag of each pixel at the motion position is updated by an Equation:

$$Mp=D1\times D2\times MUL+D1\times D4\times MUR+D3\times D2\times MLL+D3\times D4\times MLR,$$

wherein Mp indicates the first MD flag of the pixel at the motion position, MUL indicates a first MD-flag representative of an upper-left block, MUR indicates a second MD-flag representative of an upper-right block, MLL indicates a third MD-flag representative of a lower-left block, MLR indicates a fourth MD-flag representative of a lower-right block, D1 indicates a distance from the pixel to a lower edge, D2 indicates a distance from the pixel to a right edge, D3 indicates a distance from the pixel to an upper edge and D4 indicates a distance from the pixel to a left edge.

13. An apparatus for generating HDR (High Dynamic Range) images, comprising:
a camera module controller, coupled to a camera module; and
a processing unit acquiring a frame 0 and a frame 1 via the camera module controller; calculating a first MV (Motion Vector) between the frame 0 and the frame 1; acquiring a frame 2; predicting a second MV between the frame 0 and the frame 2 according to the first MV, a time interval between shooting moments of the frames 0 and 1 and a time interval between shooting moments of the frames 0 and 2; generating a first MD (Motion Detection) matrix comprising a plurality of first MD flags according to the second MV; and fusing the frame 0 with the frame 2 according to the first MD flags.

14. The apparatus of claim 13, wherein the processing unit further acquires a frame 3; predicts a third MV between the frame 0 and the frame 3 according to the first MV, a time interval between shooting moments of the frames 0 and 1 and a time interval between shooting moments of the frames 0 and 3; generates a second MD matrix according to the third MV, wherein the second MD matrix comprises a plurality of second MD flags; and fuses the frame 3 with the fused result of the frame 0 with the frame 2 according to the second MD flags.

15. The apparatus of claim 14, wherein the frames 0 and 1 are normal-exposure frames, the frame 2 is a low-exposure frame and the frame 3 is a high-exposure frame.

16. The apparatus of claim 13, wherein the calculation of the second MV between the frames 0 and 2 is calculated by an Equation:

$$MV(F0,F2)=MV(F0,F1) \times \Delta t2/\Delta t1,$$

wherein MV(F0,F1) indicates the first MV between the frames 0 and 1, $\Delta t1$ indicates the time interval between the shooting moments of frames 0 and 1, $\Delta t2$ indicates the time interval between the shooting moments of frames 0 and 2 and MV(F0,F2) indicates the second MV between the frames 0 and 2.

17. The apparatus of claim 13, wherein the processing unit further sets the first MD flags to 0; projects a motion MB (Macro Block) of the frame 0 to motion positions on the frame 2 according to the second MV; and overwrites the first MD flags of the first MD matrix, which correspond to the motion positions, with a predefined pattern.

18. The apparatus of claim 17, wherein the center of the predefined pattern is set to 7 and the other values of predefined pattern are outward decreased from the center until 1.

19. The apparatus of claim 17, wherein the predefined pattern is an 8×8 matrix as follows:
{1,2,3,4,4,3,2,1},
{2,3,4,5,5,4,3,2},
{3,4,5,6,6,5,4,3},
{4,5,6,7,7,6,5,4},
{4,5,6,7,7,6,5,4},
{3,4,5,6,6,5,4,3},
{2,3,4,5,5,4,3,2},
{1,2,3,4,4,3,2,1}, or
a 16×16 matrix as follows:
{1,1,2,2,3,3,4,4,4,4,3,3,2,2,1,1},
{1,1,2,2,3,3,4,4,4,4,3,3,2,2,1,1},
{2,2,3,3,4,4,5,5,5,5,4,4,3,3,2,2},
{2,2,3,3,4,4,5,5,5,5,4,4,3,3,2,2},
{3,3,4,4,5,5,6,6,6,6,5,5,4,4,3,3},
{3,3,4,4,5,5,6,6,6,6,5,5,4,4,3,3},
{4,4,5,5,6,6,7,7,7,7,6,6,5,5,4,4},
{4,4,5,5,6,6,7,7,7,7,6,6,5,5,4,4},
{4,4,5,5,6,6,7,7,7,7,6,6,5,5,4,4},
{4,4,5,5,6,6,7,7,7,7,6,6,5,5,4,4},
{3,3,4,4,5,5,6,6,6,6,5,5,4,4,3,3},
{3,3,4,4,5,5,6,6,6,6,5,5,4,4,3,3},
{2,2,3,3,4,4,5,5,5,5,4,4,3,3,2,2},
{2,2,3,3,4,4,5,5,5,5,4,4,3,3,2,2},
{1,1,2,2,3,3,4,4,4,4,3,3,2,2,1,1},
{1,1,2,2,3,3,4,4,4,4,3,3,2,2,1,1}.

20. The apparatus of claim 17, wherein the processing unit further calculates a MD-flag representative for at least one block comprising the pixels at the motion positions; and updates the first MD flags of the pixels at the motion positions according to the MD-flag representative.

* * * * *